Jan. 19, 1932.　　A. W. SWANSON ET AL　　1,841,769

TOOL HOLDER HAVING TOOTHED RELEASING MEANS

Filed Sept. 7, 1929

INVENTORS:
Andrew W. Swanson,
Claude W. Bennett,
BY
Fred W. _____
ATTORNEY.

Patented Jan. 19, 1932

1,841,769

UNITED STATES PATENT OFFICE

ANDREW W. SWANSON AND CLAUDE W. BENNETT, OF WHITTIER, CALIFORNIA

TOOL HOLDER HAVING TOOTHED RELEASING MEANS

Application filed September 7, 1929. Serial No. 390,917.

Our invention relates to lathe tools and particularly to tool holders.

In Reissue Patent No. 17,259 of April 9, 1929, granted to Claude W. Bennett, is disclosed a new and novel type of tool holder in which a tool was clamped in the tool holder by wedge members, the movement of one of the wedge members being used to clamp the tool, and the movement of another of the wedge members being used to release the tool.

In inserting and removing a tool from a tool holder of this class, it is desirable to have considerable clearance between the tool and the wedge members as this prevents the wedge members from interfering with the insertion and removal of the tool.

It is an object of our invention to provide a tool holder in which a large clearance is provided between the wedge members and the tool when the wedge members are in the releasing position.

It is another object of our invention to provide a tool holder in which a small movement of a wedge member in the releasing direction will provide a large clearance between the tool and the wedge member.

It is also an object of our invention to provide a tool holder in which toothed projections on a wedge member cooperate with similar projections on a backing member so that a small movement of the wedge member will permit the toothed projections to be received together in a manner to provide a large clearance between the wedge member and the tool.

It is a further object of our invention to provide a tool holder having a clamping member and a releasing member, the releasing member having toothed projections coacting with similar projections on a backing member so that a small movement of the releasing member in a releasing direction will provide a large clearance between the tool and the clamping member.

Further objects of our invention will be evidenced in the particular form of construction of the preferred form of our device.

In the accompanying drawings we have shown a preferred and alternative form of our invention in which.

Figure 1:
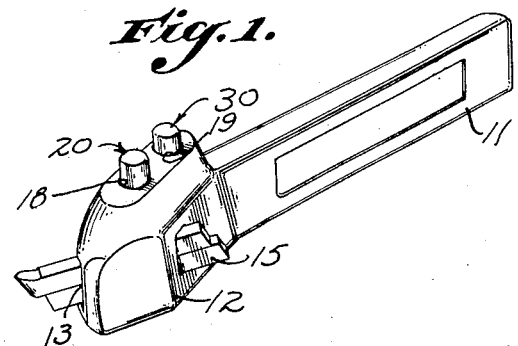
Fig. 1 is a perspective view showing the appearance of our device.
Figure 2:
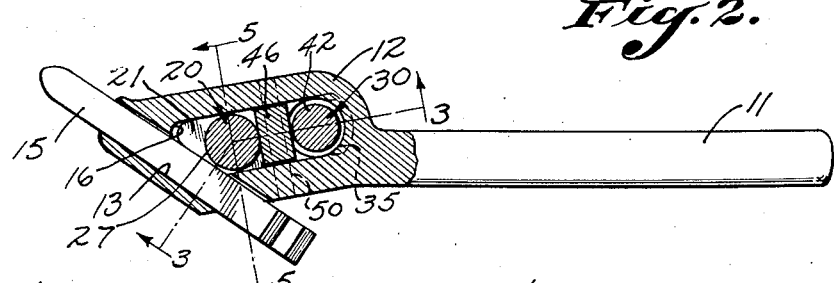
Fig. 2 is a top view partially in section of a preferred form showing the arrangement of the parts.
Figure 3:
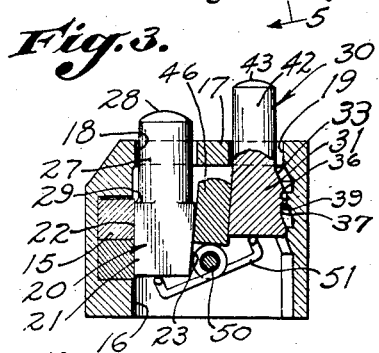
Fig. 3 is a sectional view, taken on the line 3—3 of Fig. 2, showing the parts in clamped position.

As best shown in Figs. 1 and 2 of the drawings, our device consists of a tool body in the form of a tool bar 11 having an enlarged head 12 at one end thereof. The head 12 is provided with a horizontal tool-receiving opening 13 extending therethrough at an angle of approximately 30° to the tool bar 11 and having a tool 15 inserted therein. In the head 12, to the rear of the tool-receiving opening 13, is a bore 16 which opens on the lower face of the tool bar 11 and communicates with the rear of the tool-receiving opening 13. The bore 16 has an upper wall 17 through which are formed a forward opening 18 and a rear opening 19, the openings 18 and 19 being on a line parallel to the axis of the bore 16.

Movably secured in the bore 16 are wedging or clamping members for clamping the tool 15 in position. A primary wedge member 20 is positioned at the forward end of the bore 16 and has a quadrilateral lower portion 21 providing a front face 22 which contacts a rear face of the tool 15 when the primary wedge member 20 is in the clamped position and a rear face 23 which is downwardly and inwardly beveled. Beveled side faces 24 and 25 thereof contact inclined walls of the bore 16 so as to move the primary member 20 toward the tool 15 when the primary member 20 is moved downwardly. The primary wedge member 20 has a cylindrical upper portion 27 which extends through the front opening 18 in the upper wall 17 and has a tappet head 28 formed on the upper end thereof. Shoulders 29 are formed between the portion 21 and the cylindrical portion 27 and prevent the primary member 20 from passing outwardly through the opening 18.

At the rear of the bore 16 is movably secured a secondary member 30 which has a quadrilateral lower portion 31 providing a front face 32 which is inclined parallel to the rear face 23 of the primary member 20. A rear face 33 of the portion 31 is provided with projections 34 which are adapted to be received into openings between similar projections 35 on the rear wall of the bore 16. The particular form of projections which we have provided have extending and indented vertical faces 36 and 37 between which are inclined faces 38 and horizontal faces 39, the horizontal faces 39 of the projections 34 and 35 contacting to prevent excessive downward movement of the secondary member 30, and the inclined faces 38 contacting to move the secondary member 30 forward when the secondary member 30 is raised. The secondary member 30 is provided with a cylindrical upper portion 42 which extends through the rear opening 19 in the wall 17 and is provided with a tappet head 43 at the upper end thereof. Shoulders 44 formed between the portion 31 and the cylindrical portion 42 prevent the secondary member 30 from passing outwardly through the opening 19.

Between the primary member 20 and the secondary member 30 is movably secured a block 46 which provides a front face 47 for contacting the rear face 23 of the primary member 20 and a face 48 for contacting the forward face 32 of the secondary member 30.

Supported in openings formed in the walls of the lower part of the bore 16 is a pin 50. Rotatably supported on the pin 50 is a spring 51, the ends of which contact the lower faces of the primary member 20 and the secondary member 30 so as to normally urge these members upwardly.

In the normal position of this device the primary member 20 and the secondary member 30 are maintained in raised position by the spring 51 which moves the secondary member 30 so that the projections 34 are not engaged by the projections 35 and the secondary member 30 has its maximum displacement forward. When it is desired to clamp a tool 15 in the tool-receiving opening 13, the tappet head 28 of the primary member 20 is struck with an impact tool so as to move the primary member 20 downwardly. The downward movement of the primary member 20 produces a wedging action between the rear face 23 thereof and the forward face 47 of the block 46 and between the beveled side faces 24 and 25 and the sides of the bore 16, which moves the primary member forwardly and to the left as viewed from above the tool holder and moves the primary member 20 into contact with the tool bar 15. It should be noted that the result of moving the primary member 20 forwardly and to the left produces a motion of the member at right angles to the rear face of the tool 15. When the tappet head 28 is struck with a sufficiently hard blow the primary member 20 is wedged between the block 46 and the tool 15 so as to secure the tool 15 in position.

Figure 4:
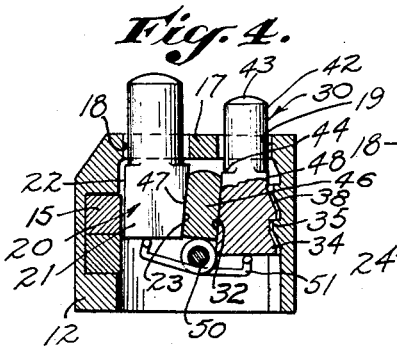
Fig. 4 is a view of the same section as Fig. 3, showing the parts in a partially released position.
Figure 5:
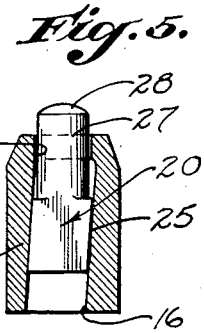
Fig. 5 is a sectional view taken on the line 5—5 of Fig. 2.

When it is desired to release the tool 15, the tappet head 43 of the secondary member 30 is struck with an impact tool so as to move the secondary member 30 downwardly. The movement of the secondary member 30 downwardly permits the engagement of the toothed projections 34 with the recesses between the projections 35 so that the secondary member 30 may be moved a relatively large distance toward the rear of the tool bar, thus releasing the wedging engagement of the primary member 20 with the tool bar 15. The primary member 20 is then raised by the action of the spring 51 to the position shown in Fig. 4, which permits the tool 15 to be removed from the tool holder.

Figure 6:
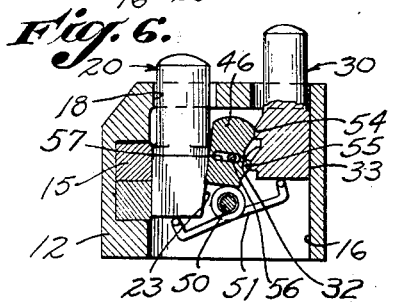
Fig. 6 is a sectional view taken on the same line as Fig. 3, showing an alternative form of our invention with the parts in the clamped position.
Figure 7:
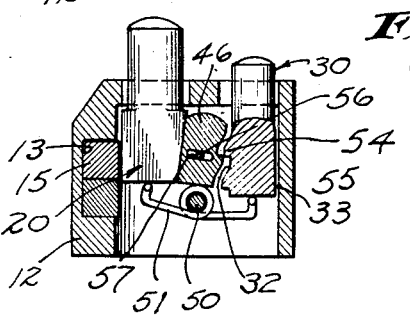
Fig. 7 is a sectional view of the same form of the invention, taken on the same line as Fig. 6, showing the parts in a partially released position.

The alternative form of our invention shown in Figs. 6 and 7 is identical with the preferred form described above with the exception that the rear face 33 of the secondary member 30 and the corresponding wall of the bore 16 are smooth so as to provide sliding contact therebetween. The forward face 32 of the secondary member 30 and the rear face 48 of the block 46 are provided with projections 54 and 55 of similar shape to the projections 34 and 35 in the preferred form. A pin 56 is secured to the walls of the bore 16 and is received into a horizontal slot 57 in the block 46 so as to hold the block 46 from vertical movement. The operation of this form of our device is identical with the preferred form except that when the secondary member 30 is moved downwardly the toothed projections 54 are received in the openings between the toothed projections 55 which permits the block 46 to move horizontally, thus releasing the wedging action of the primary mmber 20.

It should be understood that we are not limited to the particular form of construction shown in the attached drawing, as this is only a preferred form of construction, and a clamping device of our invention may consist of a single wedge member on which are formed toothed projections which contact similar toothed projections on another device which may be considered as being the backing means for the wedge member. In the preferred form of our device we have employed two wedge members as a matter of utility, the primary member 20 forming the clamping member of the wedging means and the secondary member 30 forming the releasing member thereof. The walls of the bore 16 form a backing means for the secondary member 30 in our preferred form and the walls of the block 46 form the backing means in the alternative form. Further modifications may be made in our device without departing from the broad spirit of our invention.

Although we have illustrated and described our invention as applied to a tool holder for lathes, it should be understood that we are not limited to this use as we contemplate the use of our wedge device in other capacities. For example, our wedge device may be used with a vise to hold the jaw of the vise in a clamping position, it may be used to hold the jaw of a wrench in a fixed position, and it may be used to hold the head of a jack in an elevated position. These and other uses may be employed by one skilled in the art without departing from the spirit of our invention.

We claim as our invention:

1. In a tool holder, the combination of: a tool body adapted to receive a tool; wedge means operable to clamp said tool in said tool body; toothed projections on said wedge means; a backing means held by said tool body; and toothed projections on said backing means cooperating with said toothed projections on said wedge means whereby a small movement of said wedge means in a wedging direction will produce a relatively large wedging action.

2. In a tool holder, the combination of: a tool body adapted to receive a tool and having a bore therein; a wedge means in said bore operable to clamp said tool in said tool body; toothed projections on said wedge means; a backing means held by the walls of said bore; and toothed projections on said backing means cooperating with said toothed projections on said wedge means whereby a small movement of said wedge means in a wedging direction will produce a relatively large wedging action.

3. In a tool holder, the combination of: a tool body adapted to receive a tool and having a bore therein; a primary wedge member in said bore operable to clamp said tool in said tool body; a secondary wedge member in said bore for providing a wedging action with said primary wedge member; toothed projections on said secondary wedge member; a backing means held by the walls of said bore; and toothed projections on said backing means for cooperating with said toothed projections on said secondary wedge member whereby a small movement of said secondary member in a wedging direction will produce a relatively large wedging action.

4. In a tool holder, the combination of: a tool body adapted to receive a tool and having a bore therein; a clamping wedge member in said bore adapted to clamp said tool in said tool body when moved in a clamping direction; a releasing wedge member in said bore adapted to release said clamping wedge member when moved in a releasing direction; toothed projections on said releasing wedge member; a backing means held by the walls of said bore; and toothed projections on said backing means for cooperating with said toothed projections on said releasing wedge means whereby a small movement of said releasing wedge member in said releasing direction will produce a relatively large releasing action.

In testimony whereof, the said ANDREW W. SWANSON has hereunto set his hand at Syracuse, New York, this 20th day of August, 1929, and the said CLAUDE W. BENNETT has hereunto set his hand at Whittier, California, this 27th day of August, 1929.

ANDREW W. SWANSON.
CLAUDE W. BENNETT.